J. E. TREAT.
INDICATOR FOR BELLOWS.
No. 191,624. Patented June 5, 1877.
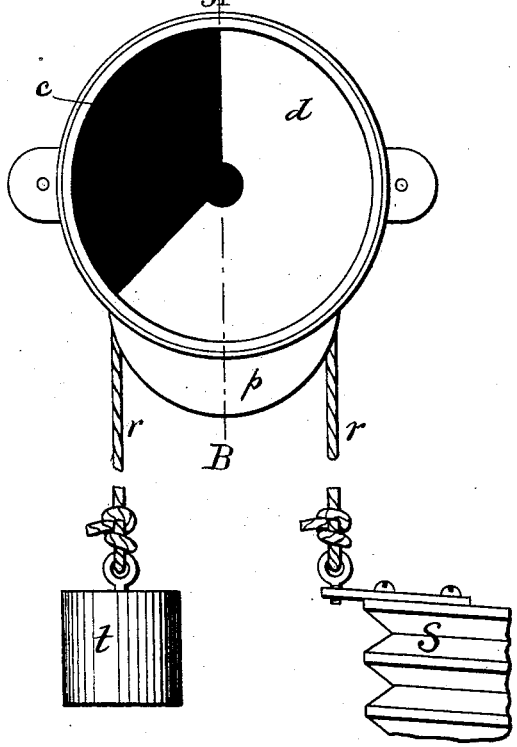
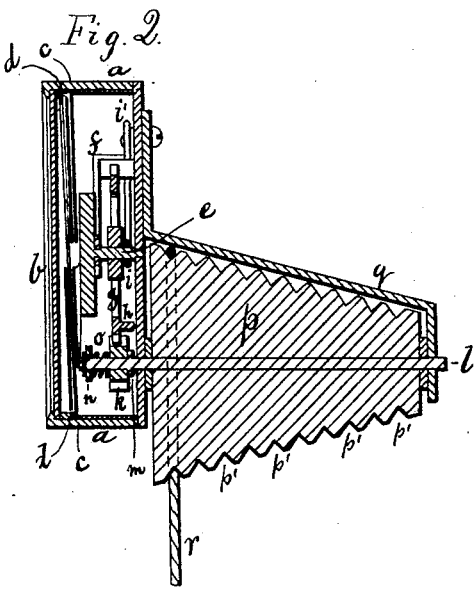
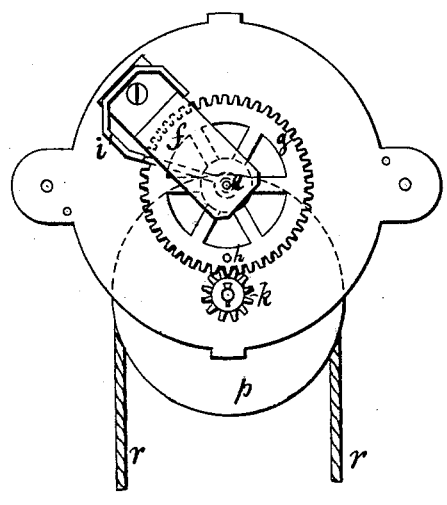
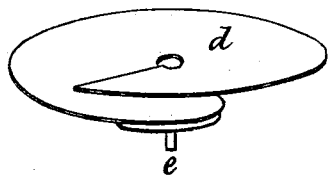
Witnesses:
Henry Chadbourn.
F. Allen.
Inventor:
James E. Treat.
by Alban Andrew
his atty.

UNITED STATES PATENT OFFICE.

JAMES E. TREAT, OF BOSTON, MASSACHUSETTS.

IMPROVEMENT IN INDICATORS FOR BELLOWS.

Specification forming part of Letters Patent No. 191,624, dated June 5, 1877; application filed November 20, 1876.

*To all whom it may concern:*

Be it known that I, JAMES E. TREAT, of Boston, in the county of Suffolk and State of Massachusetts, have invented certain new and useful Improvements in Indicators for Bellows, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in indicators for bellows, &c., used on pipe or reed organs, and for force as well as suction bellows; and the invention is equally useful for any other purpose where it becomes necessary to indicate the amount of wind contained in bellows of any kind, or for crescendo pedals, &c.

My invention consists of a case in which is located a stationary helix or screw-formed disk, in combination with a secondary helix or screw-formed disk, made of paper or suitable material, which latter disk is secured to a hub that is set in a rotary motion by means of a cord-pulley and suitable connecting mechanism from the cord-pulley shaft to the shaft to which the hub and the movable disk is secured. The cord-pulley is set in reciprocating rotary motion by means of a cord, one end of which is secured to some suitable part of the bellows, and after passing over or around said cord-pulley the other end of the cord is attached to a weight of suitable size, so as to keep the cord taut for the purpose of imparting a reciprocating rotary motion to the cord-pulley and its movable disk or indicator from the up and down movable portion of the bellows, &c., to which the end of the cord is secured.

The stationary and movable disks aforesaid are of strongly-contrasting colors, so that when the latter covers the former, in whole or part, it will readily indicate to the player or other persons the amount of wind in the bellows, &c. For instance, if the stationary disk is made black and the movable disk white, seeing the whole space black would indicate that the bellows are empty, and a complete white field would show that the bellows are full, and intermediate stages of the amount of wind in the bellows would be indicated by a partial white and black field.

This my invention is furthermore self-adjusting, so as to adjust itself to any slack or slip of the cord on its pulley or guiding-pulleys, if used, and so arranged that the movable helix-shaped disk or indicator never turns around its axis more than exactly one complete revolution in either direction, no matter how long the stroke of the bellows is, or the length of the rise and fall of the weight attached to the other end of the cord. This is accomplished by means of a friction-pinion on the cord-pulley shaft engaging into a cog-wheel on the indicator-shaft, which cog-wheel is provided with a projection that comes in contact with a stop when a complete revolution of the indicator-disk is made, after which, if the cord-pulley should continue to move in the same direction, the friction-pinion will remain stationary, and locked to the cogs of the wheel till the bellows commence to sink, when the cord-pulley commences to move in an opposite direction, and thus liberates the cog-wheel, which will be set in an opposite rotary motion by the friction-pinion, and will continue in such rotary motion to make a complete revolution, when it is again stopped by its projection striking against the stop aforesaid, even if the bellows should sink farther. As soon, however, as the bellows commence to rise, the helix-shaped disk commences to indicate, by moving over the face of the stationary helix-shaped disk, as heretofore described.

My improved indicator may be located in any desired place, and motion can easily be conveyed to it from the bellows by means of cords and pulleys, or links, &c., without departing from the spirit of my invention.

On the accompanying drawings, Figure 1 represents a front elevation of my improved indicator. Fig. 2 represents a longitudinal section on the line A B. (Shown in Fig. 1.) Fig. 3 represents a front elevation of the internal mechanism, the disks being removed. Fig. 4 represents a perspective view of the movable helix-shaped indicator.

Similar letters refer to similar parts wherever they occur on the different parts of the drawings.

*a* represents the circular case of the indicator, provided in front with a glass disk, *b*, as shown. *c* represents the stationary helix-shaped disk or indicator, secured in a suitable manner to the inside of the case *a*. *d* represents the movable helix-shaped disk or indicator, the central overlapping rear portion of which is secured to a small block or hub on the indicator-shaft *e*, of which *f* is the front bearing. To the indicator-shaft *e* is secured the cog-wheel *g*, provided with a projection, *h*, that operates against a stop-wire, *i*, having its inner end hinged on the shaft *e*, and its outer end *i* bent so as to embrace the plate *f*, by which a slight rocking motion is obtained on the said stop-wire, so as to compensate for the thickness of the projection *h* in allowing the wheel *g* to make one complete revolution in either direction before being stopped by said stop-wire.

The same object may be obtained by the use of a pair of stops, one located a little nearer the center of the cog-wheel *g* than the other, or by means of a stop and its projection being made of very thin materials, in which case the stop can be made stationary without any rocking motion; and I wish distinctly to state that I do not confine myself to the exact stop *i i'*, as shown in the drawings, as any ordinary device may answer this purpose equally as well.

The wheel *g* is geared into the cogs of the pinion *k*, that is loosely supported on the cord-pulley shaft *l*. On said shaft is a small collar, *m*, against which the rear of the pinion *k* rests. To the outer end of the shaft *l* is fixed a pin and washer, *n*, or similar equivalent device, between which and the face of the pinion *k* is located, on the shaft *l*, a coiled frictional spring, *o*, by which the pinion *k* will move positively with the shaft *l* till the projection *h* on the wheel *g* strikes against the stop *i*, when it will remain stationary, notwithstanding the continued rotary motion of the shaft *l*. *p* represents the cord-pulley, secured to the shaft *l*, and *q* represents its frame and outer bearing.

The cord-pulley *p* is shown as being conical and provided with a number of decreasing grooves, *p' p' p'*, for the purpose of placing the driving-cord in any desired groove, according to the length of the stroke of the bellows, &c.

*r* represents the cord by which the indicator is set in motion. One of its ends is secured to any movable part of the bellows *s*, of which a small view is shown in Fig. 1, and to its other end is secured a suitable weight, *t*, as shown. Of course, if the indicator is located far away from the bellows, it may be necessary to employ one or more guiding-pulleys in addition.

Having thus fully described the nature, construction, and operation of my invention, I wish to secure by Letters Patent, and claim—

1. In a bellows-indicator, the employment of one stationary helix-shaped disk in combination with a rotary helix-shaped disk and suitable connecting mechanism from the bellows, as and for the purpose set forth and described.

2. In combination, the disks *c d*, shaft *e*, gear *g*, stop *h i*, pinion *k*, shaft *l m n o*, and pulley *p*, with its cord *r* and weight *t*, substantially as and for the purpose set forth and described.

In testimony that I claim the foregoing as my own invention I have affixed my signature in presence of two witnesses.

JAMES E. TREAT.

Witnesses:
ALBAN ANDRÉN,
HENRY CHADBOURN.